(12) United States Patent
Glenn

(10) Patent No.: US 11,270,112 B2
(45) Date of Patent: Mar. 8, 2022

(54) SYSTEMS AND METHODS FOR RATING VEGETATION HEALTH AND BIOMASS FROM REMOTELY SENSED MORPHOLOGICAL AND RADIOMETRIC DATA

(71) Applicant: Precision Silver, LLC, Newberry, FL (US)

(72) Inventor: Taylor Glenn, Gainesville, FL (US)

(*) Notice: Subject to any disclaimer, the term of this patent is extended or adjusted under 35 U.S.C. 154(b) by 0 days.

(21) Appl. No.: 16/850,707

(22) Filed: Apr. 16, 2020

(65) Prior Publication Data
US 2020/0334458 A1 Oct. 22, 2020

Related U.S. Application Data

(60) Provisional application No. 62/834,532, filed on Apr. 16, 2019.

(51) Int. Cl.
| | |
|---|---|
| *G06K 9/00* | (2006.01) |
| *G06T 3/40* | (2006.01) |
| *G06T 7/11* | (2017.01) |
| *G06T 17/05* | (2011.01) |
| *B64C 39/02* | (2006.01) |

(52) U.S. Cl.
CPC ........ *G06K 9/00657* (2013.01); *B64C 39/024* (2013.01); *G06T 3/4038* (2013.01); *G06T 7/11* (2017.01); *G06T 17/05* (2013.01); *B64C 2201/123* (2013.01); *G06K 2009/00644* (2013.01); *G06T 2207/10036* (2013.01); *G06T 2207/30188* (2013.01)

(58) Field of Classification Search
CPC ..... G06K 9/00657; G06K 2009/00644; G06K 9/3241; G06T 7/11; G06T 17/05; G06T 3/4038; G06T 2207/30188; G06T 2207/10036; G06T 2207/20221; G06T 2207/30204; G06T 7/0004; G06T 7/155; G06T 7/174; B64C 39/024; B64C 2201/123
See application file for complete search history.

(56) References Cited

U.S. PATENT DOCUMENTS

| | | | |
|---|---|---|---|
| 8,503,761 B2 * | 8/2013 | Akbari | G06K 9/00637 382/154 |
| 9,592,912 B1 * | 3/2017 | Michini | G08G 5/0013 |
| 9,798,928 B2 * | 10/2017 | Carr | G06K 9/0063 |

(Continued)

*Primary Examiner* — Xuemei G Chen
(74) *Attorney, Agent, or Firm* — Maxwell L. Minch; Maxwell L Minch, Esq. PA

(57) ABSTRACT

The inventive system and method presented herein combines and integrates information to provide a more effective single rating of vegetation health and biomass. As a result the present invention provides for an objective biomass rating which produces a single numerical measure of vegetation biomass and health that can be used for quantitative comparative assessment of vegetation in research trials and in plant production. The inventive system and method further provides for remote-sensing of vegetation health and biomass based on combined assessments of morphological data (extracted from sources such as high-resolution elevation raster-maps or point-clouds produced by photogrammetric or LiDAR sensors) and radiometric data (such as spectral reflectance maps generated from multi- or hyperspectral imaging systems).

19 Claims, 6 Drawing Sheets

(56) References Cited

U.S. PATENT DOCUMENTS

| | | | | |
|---|---|---|---|---|
| 10,008,035 | B1* | 6/2018 | Redden | G06T 7/344 |
| 10,163,194 | B2* | 12/2018 | Habib | G06T 7/55 |
| 10,462,952 | B2* | 11/2019 | Koch | A01G 7/00 |
| 10,813,295 | B2* | 10/2020 | Alexander | G06T 7/0016 |
| 10,891,482 | B2* | 1/2021 | Gurzoni, Jr | G06T 17/05 |
| 11,140,813 | B1* | 10/2021 | Morrison | G06N 20/00 |
| 2010/0150431 | A1* | 6/2010 | Chen | G06K 9/00637 |
| | | | | 382/154 |
| 2011/0038523 | A1* | 2/2011 | Boardman | G06T 7/90 |
| | | | | 382/133 |
| 2011/0113030 | A1* | 5/2011 | Hunter | G16B 5/00 |
| | | | | 707/736 |
| 2011/0135197 | A1* | 6/2011 | Paris | G06T 7/00 |
| | | | | 382/165 |
| 2016/0048925 | A1* | 2/2016 | Emison | G06K 9/52 |
| | | | | 705/4 |
| 2016/0086032 | A1* | 3/2016 | Pickett | G06T 1/0007 |
| | | | | 382/110 |
| 2017/0015416 | A1* | 1/2017 | O'Connor | G05D 1/104 |
| 2017/0061211 | A1* | 3/2017 | Hundley | H04N 5/332 |
| 2017/0223947 | A1* | 8/2017 | Gall | G01N 21/4738 |
| 2017/0251600 | A1* | 9/2017 | Anderson | G01D 18/00 |
| 2018/0196987 | A1* | 7/2018 | Muehlfeld | G06K 9/4647 |
| 2018/0295355 | A1* | 10/2018 | Flanagan | H04N 1/6047 |
| 2018/0299327 | A1* | 10/2018 | Zhao | G01J 3/10 |
| 2018/0356339 | A1* | 12/2018 | Jiang | G01N 21/359 |
| 2019/0174692 | A1* | 6/2019 | Harman | C12N 15/82 |
| 2019/0179009 | A1* | 6/2019 | Klein | G01S 13/9005 |
| 2019/0259108 | A1* | 8/2019 | Bongartz | G06Q 50/02 |
| 2019/0271550 | A1* | 9/2019 | Breed | G08G 1/147 |
| 2019/0274257 | A1* | 9/2019 | Papanikolopoulos | G06K 9/6272 |
| 2019/0277749 | A1* | 9/2019 | Rushing | G01J 3/28 |
| 2020/0058132 | A1* | 2/2020 | Ishida | G06K 9/00657 |
| 2020/0074680 | A1* | 3/2020 | Kuehnle | G06T 7/80 |
| 2020/0141877 | A1* | 5/2020 | Zhu | G01N 21/84 |
| 2020/0182697 | A1* | 6/2020 | Peleg | G01J 3/00 |
| 2020/0250424 | A1* | 8/2020 | Klein | G06T 7/12 |

* cited by examiner

A				B

SYSTEMS AND METHODS FOR RATING VEGETATION HEALTH AND BIOMASS FROM REMOTELY SENSED MORPHOLOGICAL AND RADIOMETRIC DATA

CROSS-REFERENCE TO RELATED APPLICATIONS

This application claims the benefit of U.S. Provisional Application No. 62/834,532, having a filing date of Apr. 16, 2019, the disclosure of which is hereby incorporated by reference in its entirety and all commonly owned.

FIELD OF INVENTION

The present invention related to image and light detection and ranging (LiDAR) data processing and, in particular, image and LiDAR data processing for rating and assessing vegetation health and biomass of a vegetative region of interest (VROI).

BACKGROUND

Measurement of health and biomass is useful in vegetation related research and development as well as commercial plant (agri-/horti-/silvi-culture, etc) production. For example, agriculture input producers may conduct research to measure the effectiveness of a new compound by measuring its effects on plant biomass and health between treated and untreated samples. However typical methods are complex and do not provide mosaic images to allow for review of objective data related to a VROI.

It should be appreciated that growers may like to identify areas with potentially reduced yield as candidates for interventions. Typically, remote sensing approaches to assessing the amount and health of vegetation use either a morphological approach of measuring the size and shape of the vegetation, or a radiometric approach that assesses the biophysical properties of the vegetation by measuring the absorbed/emitted/reflected electromagnetic radiation (light). Both approaches have drawbacks, such as limited assessment of canopy understory and lack of account for vegetation quality in morphological measurements, and disregard of vegetation volume in radiometric approaches.

Thus there remains an unmet need for remote-sensing based on combined assessments of morphological data (extracted from sources such as high-resolution elevation raster-maps or point-clouds produced by photogrammetric or LiDAR sensors) and radiometric data (such as spectral reflectance maps generated from multi- or hyper-spectral imaging systems).

SUMMARY OF INVENTION

The present invention combines and integrates information from both types of sources to provide a more effective single rating of vegetation health and biomass. As a result the present invention provides for an objective biomass rating which produces a single numerical measure of vegetation biomass and health that can be used for quantitative comparative assessment of vegetation in research trials and in plant production.

One aspect of the present invention is that a biomass index is created for objective comparison to one or more vegetative regions of interest (VROI). To create the biomass index, the morphological and radiometric input data sources are co-registered, identifying vegetation regions in the input data via a segmentation process, computing a morphological measure such as the height above ground of each identified vegetation pixel, computing a radiometric measure such as the Normalized Difference Vegetation Index (NDVI) at each identified vegetation pixel, combining and integrating the morphological and radiometric measures at each pixel, optionally weighting the result by global appearance factors such as vegetative fill fraction, and then optionally normalizing the combined measurement by a normalizing factor such as assessment area to promote comparison across differing assessment sizes.

This summary is provided to introduce a selection of concepts in a simplified form that are further described below in the Detailed Description. The foregoing has outlined some of the pertinent objects of the invention. These objects should be construed to be merely illustrative of some of the more prominent features and applications of the intended invention. Many other beneficial results can be attained by applying the disclosed invention in a different manner or modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

BRIEF DESCRIPTION OF DRAWINGS

Examples illustrative of embodiments of the disclosure are described below with reference to figures attached hereto. In the figures, identical structures, elements or parts that appear in more than one figure are generally labeled with the same numeral in all the figures in which they appear. Dimensions of components and features shown in the figures are generally chosen for convenience and clarity of presentation and are not necessarily shown to scale. Many of the figures presented are in the form of schematic illustrations and, as such, certain elements may be drawn greatly simplified or not-to-scale, for illustrative clarity. The figures are not intended to be production drawings. The figures (Figs.) are listed below FIG. 1 provides a flow chart illustrating at least one embodiment of the present invention.

Figure 1:
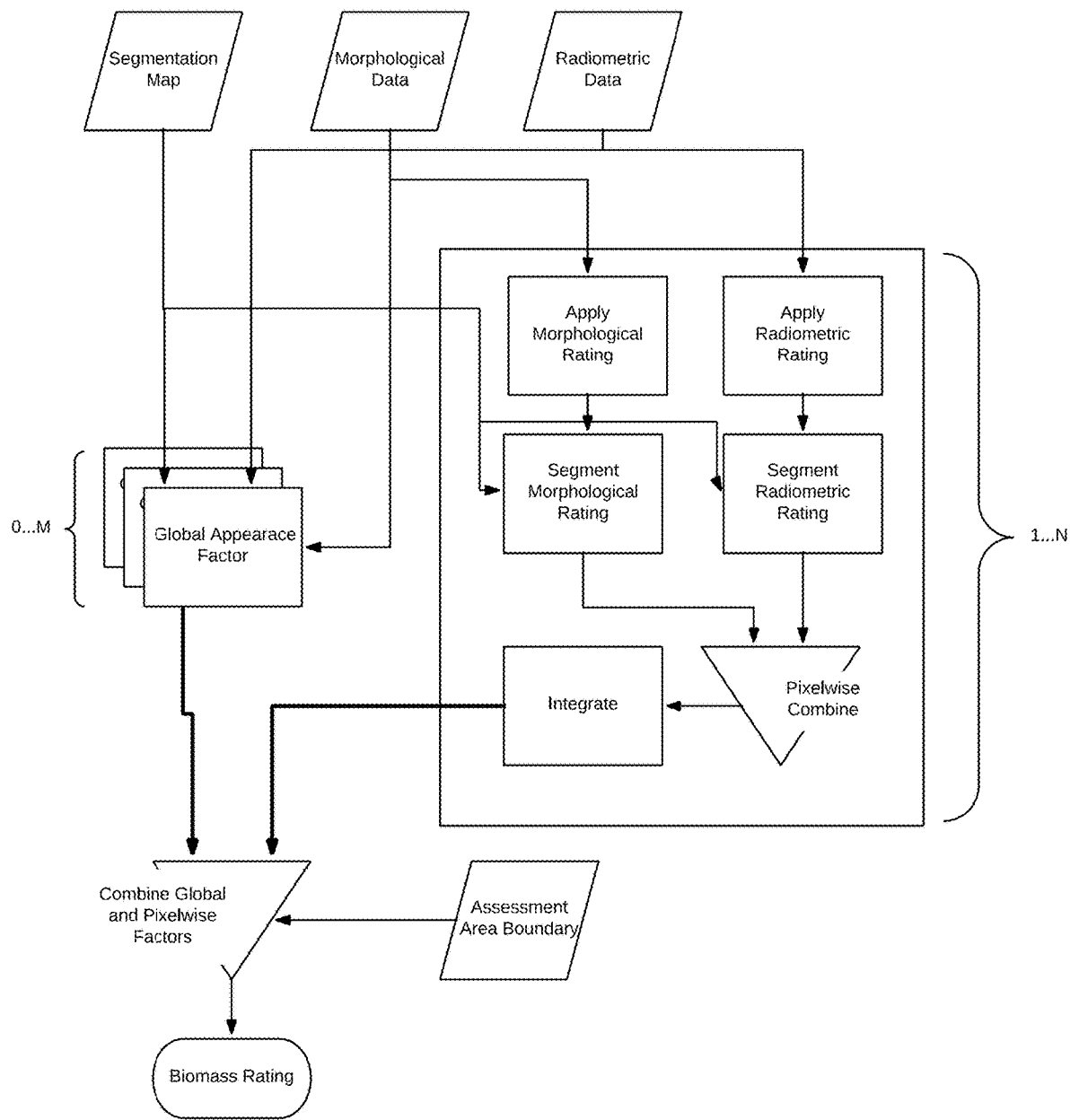
Figure 2:
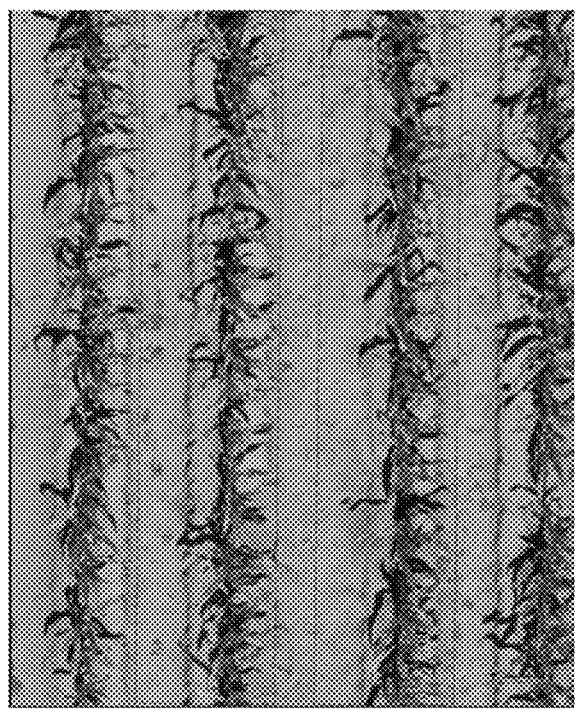
FIG. 2 provides examples of visible light imagery of two sample VROIs labeled A and B. Dotted lines indicate the two center measured rows of vegetation, while the outer two rows of vegetation in each plot are not measured and are not used for comparison. VROI A produces a Biomass Index rating of 3.79 whereas VROI B produces a Biomass Index rating of 4.34.
Figure 2:
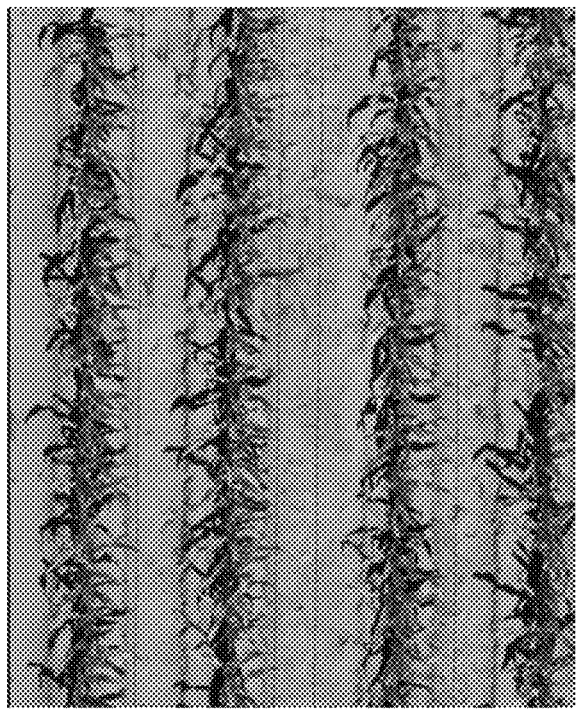
Figure 3:
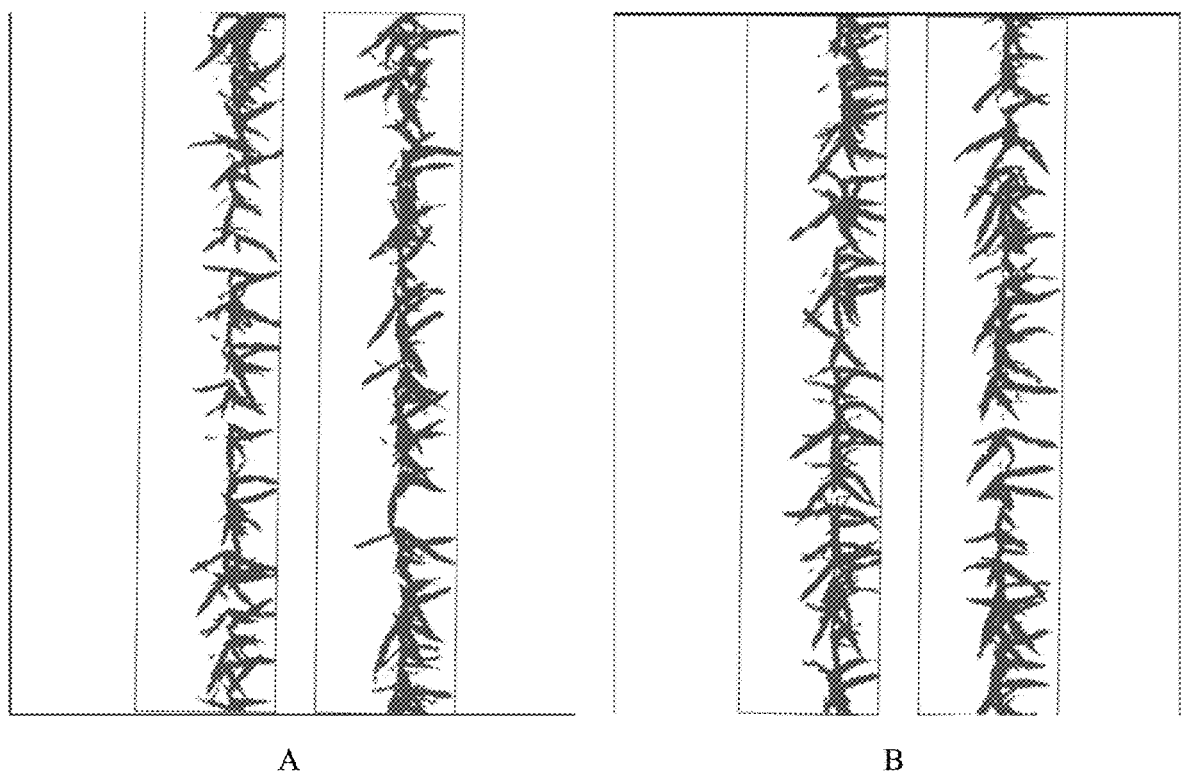
FIG. 3 provides examples of segmentation maps for two VROIs labeled A and B. The segmentation maps are produced from the visible light imagery shown in FIG. 2.
Figure 4:
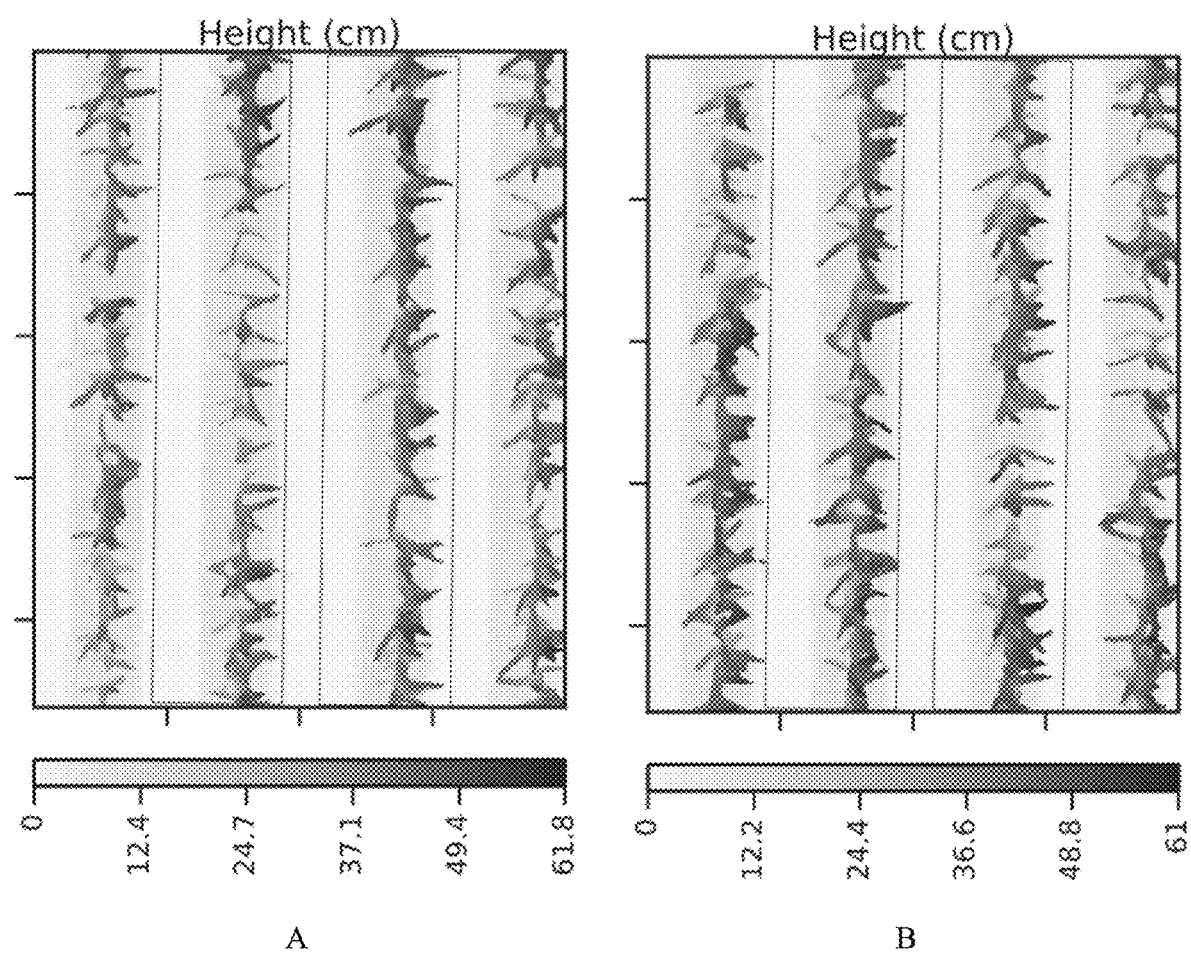
FIG. 4 provides examples of height maps for two VROIs labeled A and B. Color bars beneath each image show a conversion of pixel shade to height values measured in centimeters. VROI A has a total volume under canopy in the measured regions of 0.53 cubic-meters, while VROI B has a total volume under canopy in the measured regions of 0.62 cubic-meters.
Figure 5:
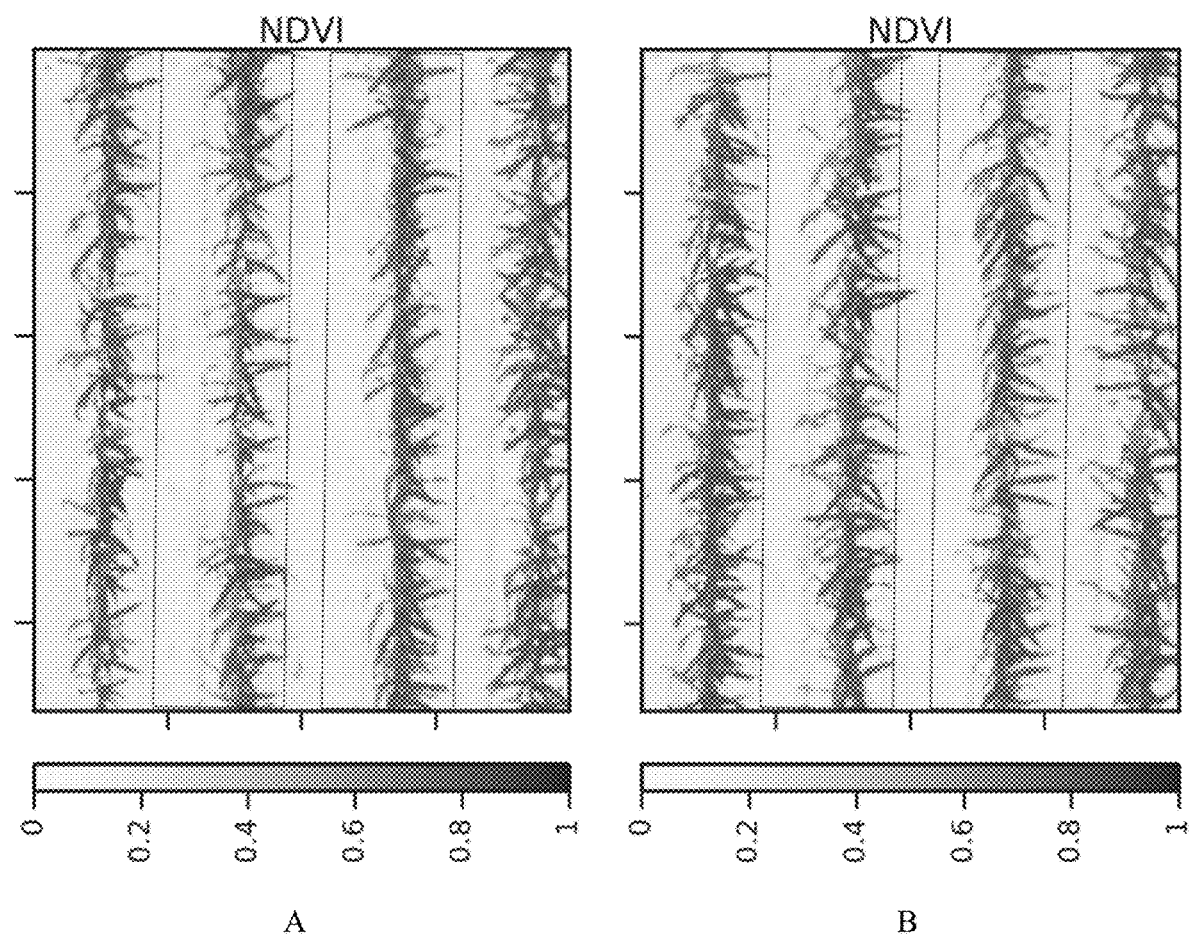
FIG. 5 provides examples of NDVI vegetation index maps for two VROIs labeled A and B. Color bars beneath each image show a conversion of pixel shade to vegetation index values. VROI A has an average vegetation index value in the vegetation pixels of 0.59 while VROI B has an average vegetation index value in the vegetation pixels of 0.61.
Figure 6:
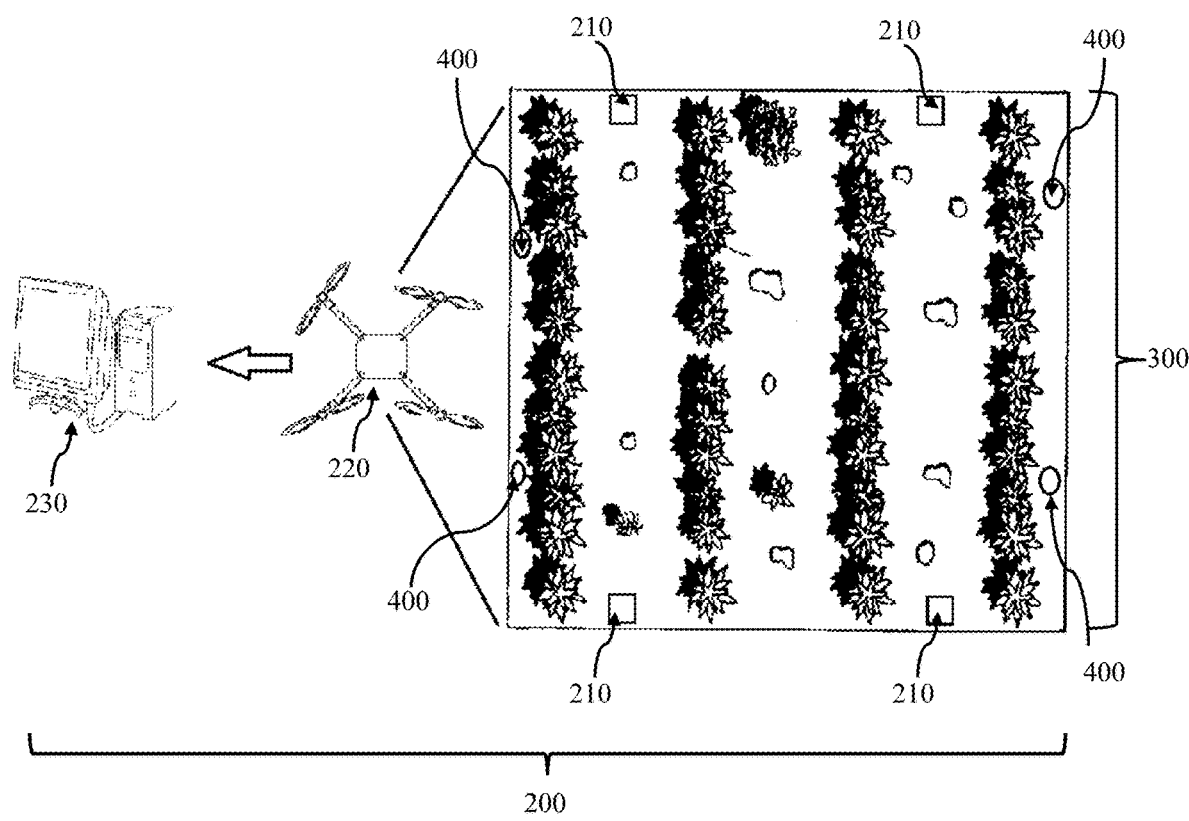
FIG. 6 provides at least one embodiment of the 200 inventive system which includes 210 one or more spectral calibration markers placed within a 300 VROI, 220 one or more photographic image capturing platforms for capturing image data of a 300 VROI and 230 one or more computing devices which implements one or more methods for rating vegetation health and biomass if the vegetation in the 300 VROI. Also illustrated is 400 one or more ground control markers which may be used in certain embodiments.

It should be clear that the description of the embodiments and attached Figures set forth in this specification serves only for a better understanding of the invention, without limiting its scope. It should also be clear that a person skilled in the art, after reading the present specification could make adjustments or amendments to the attached Figures and above described embodiments that would still be covered by the present invention.

DETAILED DESCRIPTION

The following detailed description is merely exemplary in nature and is in no way intended to limit the scope of the invention, its application, or uses, which may vary. The invention is described with relation to the non-limiting definitions and terminology included herein. These definitions and terminology are not designed to function as a limitation on the scope or practice of the invention, but are presented for illustrative and descriptive purposes only.

The present invention provides for systems and methods for rating vegetation health and biomass. Systems and methods use one or more platforms for acquiring image data. Further included are one or more spectral calibration marker placed in or near one or more vegetative regions of interest (VROI) along with the use of one or more ground control markers placed in or near said VROI. The use of the calibration markers and ground control markers provide for reference data for orienting pixel data to the VROI while providing calibration data for providing reference data for comparison in the generation of objective biomass indexes.

The inventive systems and methods further include the use of one more computing devices. Inclusive of such computing devices is at least one processor that is configured to execute a sequence of programmed instructions that cause the processor to implement the one or methods disclosed herein.

The inventive systems and methods further include the use of one or more data collection systems. Various systems are known in the art. Data may be collected from sensors mounted to an aerial vehicle, unmanned aerial vehicle, ground vehicle, person, etc. Embodiments of the inventions may further use sensors. For example, morphological data may originate from sensors such as Light Detection and Ranging (LiDAR) or photogrammetric processing of images, radiometric data may originate from sources such as imaging sensors (like multispectral cameras, hyperspectral cameras, digital cameras) or point sensors (like point spectrometers or photosensors)

One or more embodiments of the invention further include the use of image mosaicking software and photogrammetric software. In such embodiments, such software may be used to process multiple images from an input sensor to produce radiometric map data and/or point-cloud/elevation map data.

Methods of the present invention allow for the creation of an objective index for the evaluation of a VROI to determine vegetation health and biomass. Method include the calculation of at least one or more maps including, generating one or more mosaic maps of a VROI, generating one or more segmentation maps of a VROI, generating one or more height maps of a VROI, or generating one or more Normalized Difference Vegetation Index (NDVI) maps of said VROI The present invention further provides for the use of one or more algorithms to be used to arrange and calculate the data obtained from the images, calibration markers, and photographic data.

Various terms used throughout the specification and claims are defined as set forth below as it may be helpful to an understanding of the invention.

As used herein, Normalized Difference Vegetation Index (NDVI) shall mean the calculated index using one or more algorithms resulting from the application of one or more systems or methods of the present invention.

As used herein, vegetative regions of interest (VROI) shall mean one or more regions of interest of a vegetative area desired to be measured.

As used herein, photogrammetry shall mean making measurements from photographs which includes position measurements, height measurements, spectral measurement, or combinations thereof.

As used herein, photographic images shall mean any images resulting from any imaging technique known in the art, including, without limit, photographs, radio wave, radar data LiDAR, infrared imaging, near infrared imaging, or combinations thereof.

As used herein, morphological information shall mean any source of data about the physical form of the vegetation, including, for example, the absolute height of a pixel location, or a digital elevation map (DEM), from a Point-cloud, Rasterized Elevation Map Image, or similar.

As used herein, Radiometric data shall mean data which may be obtained from one or more Multispectral Reflectance Map Image, Vegetation Index Map Image, or similar.

General

Aspects of the invention include a method for rating vegetation health and biomass through the use of one or more spectral calibration marker placed in or near one or more vegetative regions of interest (VROI), which includes generating one or more mosaic maps of a VROI; generating one or more segmentation maps of the VROI, generating one or more height maps of the VROI, generating one or more Vegetation Index (VI) maps of the VROI, and generating the Biomass Index to provide a rating of the vegetation health and biomass in a VROI.

In certain embodiments, generating one or more mosaic maps includes the steps of obtaining one or more photographic images of a VROI, the one or more photographic images containing RGB data and multi-spectral data, performing photogrammetry of the RGB data from the one or more photographic images of a VROI to obtain morphological information related to the VROI on each image, and arranging together the individual photographic images respective to physical location within a VROI and orienting to the ground control markers to create a mosaic image of the VROI using the one or more photographic images of a VROI.

In certain embodiments, the photographic images are obtained using a visible-light digital camera (RGB camera) and a multispectral camera of said VROI.

In certain embodiments, the multi-spectral photos include photographs of light at additional wavelength regions.

In certain embodiments, morphological information includes the absolute height of a pixel location, or a digital elevation map (DEM).

In certain embodiments, generating one or more segmentation maps of said VROI includes the steps of classifying each pixel location of the mosaic map based on the visible pattern of each pixel location, and producing a pixel map having binary value pixels representative of the presence or absence of a visible pattern.

In certain embodiments, the visible pattern is classified by the color, texture, edge, or combinations thereof.

In certain embodiments, generating one or more height maps of the VROI includes the steps of processing the morphological information to generate a value representing a height above ground map at each pixel location.

In certain embodiments generating one or more VI maps of the VROI includes the steps of performing photogrammetry of said multi-spectral data and calibrating, using the marker data, to provide a reflectance map for each multi-spectral band of light measured, and applying one or more algorithms for normalizing the difference between near infrared and red spectral bands.

In certain embodiments, generating one or more VI maps of the VROI includes the steps of performing photogrammetry of the multi-spectral data and calibrating the multi-spectral data, using the marker data, to provide a reflectance map for each multi-spectral band of light measured, and applying one or more algorithms for making a combination of the multi-spectral band values to produce a single vegetation index value at each pixel location.

In certain embodiments, one or more databases are used for retaining and organizing information for each pixel related to the data used for the mosaic map, segmentation map, height maps, or NDVI maps, wherein each of the data elements for each pixel location may be accessed by one or more users.

In certain embodiments, generating the Biomass Index is accomplished using the equation defined in ALG1.

In certain embodiments, the method further includes the use of one or more ground control markers placed in or near the VROI.

In certain embodiments, the database further comprises the Biomass Index for a VROI.

In certain embodiments, the Biomass Index for a particular VROI is compared to the Biomass Index for a different VROI, wherein the higher computed Biomass Index is indicative of healthier vegetation than the lower computed Biomass Index.

In certain embodiments, the method further includes displaying a mosaic map of one or more captured or generated images wherein upon selection of a VROI using one or more peripherals of a computing device, one or more information stored for that VROI in said database is displayed adjacent to, or overlaid upon, the mosaic map.

It should be appreciated that the inventive methods may include any combination, or all, of the described features, embodiments, or aspects of the invention as described herein, or otherwise known in the art.

Other aspects of the present invention include a system for rating vegetation health and biomass, which includes one or more spectral calibration markers, one or more photographic image capturing platforms having one or more of a visible-light digital camera or a multispectral camera, and one or more computing devices implementing a computer-usable medium having a sequence of instructions which, when executed by a processor of the computing device, causes the processor to execute a process one or more methods for rating vegetation health and biomass through the use of said one or more spectral calibration marker placed in or near one or more vegetative regions of interest (VROI), as disclosed herein.

In certain embodiments, the system further includes one or more ground control markers.

In certain embodiments, the one or more photographic image capturing platforms having one or more of a visible-light digital camera or a multispectral camera is attached to an aerial vehicle.

In certain embodiments, the system further includes one or more means for communicating the information capture by said one or more photographic image capturing platforms to one or more computing devices.

It should be appreciated that the inventive system may include any combination, or all, of the described features, embodiments, or aspects of the invention as described herein, or otherwise known in the art.

System

The present invention provides for a system for rating vegetation health and biomass which includes one or more spectral calibration markers, one or more photographic image capturing platforms having one or more of a visible-light digital camera or a multispectral camera and one or more computing devices for implementing one or more inventive methods as described further herein.

The inventive system is utilized by placing one or more or the spectral calibration markers in a VROI to allow for a calibration measurement of the VROI for the purpose of capturing and calibrating multi-spectral photos taken of a VROI. The one or more photographic image capturing platforms of the system then captures images, and the images are processed using the one or more computing devices which implements one or more inventive methods for evaluating vegetative health and biomass, as further described herein.

In at least one embodiment, the inventive system further comprises one or more ground control markers. The use of the calibration markers and ground control markers provide for reference data for orienting pixel data to the VROI while providing calibration data for providing reference data for comparison in the generation of objective biomass indexes.

In at least one embodiment, the photographic image capturing platforms includes one or more of a visible-light digital camera or one or more multispectral camera. In at least one embodiment, the photographic image capturing platforms is an aerial vehicle.

Mosaic Maps

In at least one embodiment of the invention, one or more mosaic maps are created which are created by obtaining one or more photographic images of a VROI which includes standard visible-wavelength red, green, and blue (RGB) data and multi-spectral data. Photogrammetry is performed using the RGB data from said one or more photographic images of a VROI to obtain morphological information related to the VROI on each image. Upon obtaining morphological information, the photographic images are arranged together respective to physical location within a VROI and oriented to the ground control markers to create a mosaic image of the VROI.

It is appreciated that multi-spectral photos are images of light at selected wavelength regions, and may include visible and non-visible wavelengths. The multi-spectral data is calibrated against one or more spectral calibration markers placed in or near the one or more VROI's.

Segmentation Maps

In at least one embodiment of the invention, one or more segmentation maps of said VROI are generated by classifying each pixel location said mosaic map based on the visible pattern of each pixel location and producing a pixel map having binary value pixels representative of the presence or absence of a visible pattern. It is appreciated that many measures could be used to interpret the visible pattern, and nothing herein is intended to limit the features used to identify the visible pattern. Examples include using the pixel color, pixel-region texture, pixel-region edges, or combinations thereof Height Maps In at least one embodiment of the invention, one or more height maps of the VROI is generated by processing the morphological information to generate a value representing a height above ground map at each pixel location.

Normalized Difference Vegetation Index (NDVI) Maps

In at least one embodiment of the invention, one or more NDVI maps of the VROI is generated by performing photogrammetry of the multi-spectral data and calibrating, using the marker data to provide a reflectance map for each multi-spectral band of light measured, and applying one or more algorithms for normalizing the difference between near infrared and red spectral bands.

Computational Algorithms

It is appreciated that in order to provide an objective measure of vegetative health and biomass index, one or more algorithms are applied in order to calculate a biomass index, which provides a metric comparable across differing plot sizes. In at least one embodiment, the algorithm, ALG. 1, is as follows: Given Morphological input data (M), Radiometric input data (R), Segmentation map (S), and Assessed area (A), each pixel-wise rating factor is computed using ALG. 1.1.

ALG. 1.1: compute $P_i$, $\forall i \in 1 \ldots N$
$H_i \leftarrow$ get segmentation active pixels of rating $H_i(M)[S]$;
$V_i \leftarrow$ get segmentation active pixels of rating $V_i(R)[S]$;
$P_i \leftarrow$ integrate pixel values using $I_i(H_i, V_i)$ In at least one non-limiting example, the following calculation occurs $I_i(H_i, V_i) = \Sigma_{x,y \in S} H_{i_{x,y}} V_{i_{x,y}}$.

Compute each area-wide appearance factor using ALG. 1.2

ALG. 1.2: compute $F_i$, $\forall i \in 0 \ldots M$

Where each area-wide appearance factor may have a distinct computation method designed to best suit the specific implementation of the system. In at least one non-limiting example, $F_0$=Area(S)/FilledArea(S), where Area(S) is the count of the number of active pixels in the segmentation map S, and FilledArea(S) is the count of the number of active pixels after filling holes in the connected components of the segmentation map S.

Then finally compute the biomass index (B) is using ALG 1.3:

ALG. 1.3: $B \leftarrow C(A, P_1, \ldots, P_N, F_1, \ldots, F_M)$, where, for example, $$C(A, P_1, \ldots, P_N, F_1, \ldots, F_M) = \frac{1}{A}\left(\prod_{i=1}^{N} P_i\right)^{\frac{1}{N}}\left(\prod_{i=1}^{M} F_i\right)^{\frac{1}{M}}.$$

EXAMPLES

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

Example 1

A system for rating vegetation health and biomass is used for the evaluation of vegetation health biomass of a particular vegetative region of interest (VROI). The system includes a plurality of spectral calibration markers pre-staged about the VROI, a plurality of ground control markers pre-staged about the VROI and an aerial vehicle system operating as a photographic image capturing platforms which includes a visible-light digital camera (RGB camera) and a multispectral camera for image collection of the VROI.

It is appreciated that there are several photographic image capturing platforms known in the art which are incorporated as vehicles, whether land or aerial vehicles. In at least one embodiment, the photographic image capturing platform is an aerial vehicle. In at least one embodiment, the aerial vehicle is an unmanned remote controlled aerial vehicle or aerial drone.

First the segmentation map, height map, and NDVI maps are generated as taught herein. The Segmentation map computed from high-resolution visible imagery, the Normalized Difference Vegetation Index (NDVI) map is computed from the radiometric data source, and the height map is computed from photogrammetric processing of high resolution visible imagery as the morphological data source. All input data are co-registered and gridded to same per-pixel resolution. The computed data is then used to calculate the biomass index.

The segmentation map is applied to the NDVI map to calculate NDVI pixel values in order to restrict response within measured region to only vegetation pixels so that non-vegetation areas (soil, shadows) do not skew the ratings effectiveness. The segmentation map is further applied against the height map in order to calculate the height pixel values. This allows for the restriction of the height/volume measurements to desired vegetation canopy For each pixel location in the segmentation map, the height value at that location is multiplied by the NDVI value at that location to get VI-weighted height values to fuse two sources of information about vegetation health and biomass. Height (after division by pixel area) gives a vegetation volume, while NDVI gives both vegetation health indication and indication of biomass-levels due to canopy understory absorption.

Next the VI-weighted heights are multiplied by pixel area to get VI-weighted-volume pixels. This is used to scale the fused rating by its area of assessment to make the rating more physically meaningful and more comparable across differing imaging resolutions. All VI-weighted-volume values are summed to get total-VI-weighted-volume, thus integrating all of the VI-weighted-volume information over the region of interest such as a research plot into a single rating.

Morphological-closing of segmentation map is then computed to get a filled-segmentation-map, then divided by the number of segmentation map active pixels by the number of filled-segmentation-map active pixels to get the filled-area-ratio to provide an additional source of compiled information about health and biomass as, when compared to other plots in a research trial, a fuller canopy with fewer shadows could indicate more photosynthetic effectiveness and vegetation biomass.

The total-VI-weighted-volume is multiplied by the filled-area-ratio to get an unnormalized biomass index to fuse the pixel-wise and area-wide biomass information.

The unnormalized biomass index is divided by the assessed area to get final biomass index thus providing a metric comparable across differing plot sizes

OTHER EMBODIMENTS

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the described embodiments in any way. Rather, the foregoing detailed description will provide those skilled in the art with a convenient road map for implementing the exemplary embodiment or exemplary embodiments. It should be understood that various changes can be made in the function and arrangement of elements without departing from the scope as set forth in the appended claims and the legal equivalents thereof.

The invention claimed is:

1. A method for rating vegetation health and biomass through the use of one or more spectral calibration marker placed in or near one or more vegetative regions of interest (VROI), the method comprising:
generating one or more mosaic maps of a VROI;
generating one or more segmentation maps of said VROI thereby producing a pixel map having binary value pixels representative of the presence or absence of a visible pattern;
generating one or more height maps for each pixel of said VROI having a visible pattern;
generating one or more Vegetation Index (VI) maps of said VROI; and
generating a Biomass Index based on data obtained from the VI map, height map and segmentation map to provide a rating of the vegetation health and biomass at a pixel location.

2. The method of claim 1 wherein generating one or more mosaic maps comprises the steps of:
obtaining one or more photographic images of a VROI, said one or more photographic images containing RGB data and multi-spectral data;
performing photogrammetry of said RGB data from said one or more photographic images of a VROI to obtain morphological information related to the VROI on each image; and
arranging together said individual photographic images respective to physical location within a VROI and orienting to one or more ground control markers to create a mosaic image of the VROI using the one or more photographic images of a VROI.

3. The method of claim 2 wherein said photographic images are obtained using a visible-light digital camera (RGB camera) and a multispectral camera of said VROI.

4. The method of claim 2 wherein said photographic images containing RGB data and multi-spectral data include photographs of light at additional wavelength regions.

5. The method of claim 2 wherein said morphological information is the absolute height of a pixel location, or a digital elevation map (DEM).

6. The method of claim 1 wherein said generating one or more segmentation maps of said VROI comprises the steps of:
classifying each pixel location at said mosaic map based on a visible pattern of each pixel location; and
producing a pixel map having binary value pixels representative of the presence or absence of a visible pattern.

7. The method of claim 6 wherein said visible pattern is classified by color, texture, edge, or combinations thereof.

8. The method of claim 1 wherein said generating one or more height maps of said VROI comprises the steps of processing morphological information from one or more photographic images to generate a value representing a height above ground map at each pixel location.

9. The method of claim 1 wherein said generating one or more VI maps of said VROI comprises the steps of:
performing photogrammetry of multi-spectral data and calibrating, using data obtained using said spectral calibration markers, to provide a reflectance map for each multi-spectral band of light measured; and
applying one or more algorithms for normalizing the difference between near infrared and red spectral bands.

10. The method of claim 1 wherein said generating one or more VI maps of said VROI comprises the steps of:
performing photogrammetry of multi-spectral data and calibrating, using data obtained using said spectral calibration markers, to provide a reflectance map for each multi-spectral band of light measured; and
applying one or more algorithms for making a combination of the multi-spectral band values to produce a single vegetation index value at each pixel location.

11. The method of claim 1 further comprising one or more databases for retaining and organizing information for each pixel related to the data used for said mosaic map, segmentation map, height maps, or VI maps, wherein each of the data elements for each pixel location may be accessed by one or more users.

12. The method of claim 11 wherein the database further comprises the Biomass Index.

13. The method of claim 11 wherein the Biomass Index for a particular pixel location is compared to the Biomass Index for a different pixel location, wherein the higher computed Biomass Index is indicative of healthier vegetation than the lower computed Biomass Index.

14. The method of claim 11 further comprising displaying a mosaic map of images, wherein upon selection of a pixel location using one or more computing peripheral, one or more information stored for that pixel location in said database is displayed.

15. The method of claim 1 further comprising the use of one or more ground control markers placed in or near said VROI.

16. A system for rating vegetation health and biomass, the system comprising:
one or more spectral calibration markers;
one or more photographic image capturing platforms having one or more of a visible-light digital camera or a multispectral camera;
one or more computing devices implementing a computer-usable medium having a sequence of instructions which, when executed by a processor of the computing device, causes the processor to execute a process for rating vegetation health and biomass through the use of said one or more spectral calibration markers placed in or near one or more vegetative regions of interest (VROI), the method comprising:

generating one or more mosaic maps of a VROI;

generating one or more segmentation maps of said VROI thereby producing a pixel map having binary value pixels representative of the presence or absence of a visible pattern;

generating one or more height maps for each pixel of said VROI having a visible pattern;

generating one or more Vegetation Index (VI) maps of said VROI; and generating a Biomass Index based on data obtained from the VI map, height map and segmentation map to provide a rating of the vegetation health and biomass at a pixel location.

17. The system of claim 16 further comprising one or more ground control markers.

18. The system of claim 16 wherein said one or more photographic image capturing platforms having one or more of a visible-light digital camera or a multispectral camera is attached to an aerial vehicle.

19. The system of claim 16 further comprising one or more means for communicating the information captured by said one or more photographic image capturing platforms to one or more computing devices.

\* \* \* \* \*